United States Patent [19]
Korb, Jr. et al.

[11] 3,874,256
[45] Apr. 1, 1975

[54] BICYCLE BRAKE CALIPER ADJUSTING TOOL

[76] Inventors: Charles R. Korb, Jr., 5562 S. Cedar; John F. Boning, 6192 S. Crestview St., both of Littleton, Colo. 80120

[22] Filed: Sept. 26, 1973

[21] Appl. No.: 400,793

[52] U.S. Cl. ............... 81/3 R, 254/100, 188/196 V
[51] Int. Cl. ...................... B25b 11/00, F16d 65/46
[58] Field of Search ......... 81/3 R; 254/100; 188/24, 188/196 V

[56] References Cited
UNITED STATES PATENTS

| | | | |
|---|---|---|---|
| 369,719 | 9/1887 | Jennings | 254/100 |
| 427,144 | 5/1890 | Blume | 254/100 |
| 2,060,780 | 11/1936 | Woodworth | 254/100 |
| 2,237,230 | 4/1941 | Johnson | 254/100 |
| 2,554,910 | 4/1951 | Jensen | 254/100 |
| 3,411,749 | 11/1968 | Glassman | 254/100 |

*Primary Examiner*—Al Lawrence Smith
*Assistant Examiner*—Roscoe V. Parker
*Attorney, Agent, or Firm*—Phillip L. DeArment, Esq.

[57] ABSTRACT

The brake adjusting tool maintains tension on the cable bridle to hold an adjusted relation between brake pads supported on calipers pivoted by the cable bridle and the rim of the braked wheel while actuating cable is reconnected to the bridle to eliminate slack in the cable actuating system and thereby adjust the brakes. The tool applies tension through an L-shaped carriage engaging the bridle and movable along an elongated threaded guide extending from a base supportable on the dual calipers. A nut disposed between the base and carriage moves the carriage along the threaded guide to establish and/or maintain tension on the bridle.

5 Claims, 3 Drawing Figures

BICYCLE BRAKE CALIPER ADJUSTING TOOL

BACKGROUND OF THE INVENTION

Multiple speed bicycles have dramatically increased use of cable actuated rim brakes. There are several varieties of this brake system and one such variety is a dual caliper, bridle actuated system wherein the pivoted calipers support the friction brake pads and are pivoted by a cable bridle connected to the hand actuated brake lever by an actuator cable. The actuator cable and bridle are connected through a connector which permits adjustment of the bridle relative to the actuator cable.

The bridle actuated brake system requires periodic adjustment to compensate for wear of brake pads and stretch in the cable system. Prior to the present invention, this adjustment was time consuming and difficult to accomplish. Essentially it was performed by hand which required moving the brake pads into a position wherein minimum clearance exists between the pads and the wheel rim. Holding this position while tensioning the bridle, disconnecting the connection between the connector and actuating cable and pulling taut and reconnecting the actuating cable. The foregoing steps must be performed without permitting any unwanted slack to develop.

Accordingly, the present invention has an object to provide a tool that will assist in adjusting the brakes of a bridle-actuated dual caliper brake system.

A further object of the present invention is to provide a tool that will maintain the tension on the bridle while the connection between the bridle and actuating cable is adjusted.

A still further object of the present invention is to provide a simple, inexpensive tool that can adjust a cable actuated brake system throughout the entire wear cycle of the brake pads.

Another object is to provide a new and improved method of adjusting the brake system of a bicycle comprising placing an extensible tool to apply and maintain tension on the bridle while the connection between the bridle and actuating cable is adjusted to 9emove unwanted slack in the cable system and removing the tool after the adjustment is completed.

These and other objects will become apparent to those skilled in the art with reference to the following description of a preferred embodiment of the invention taken in conjunction with the drawings and in which.

Figure 1:
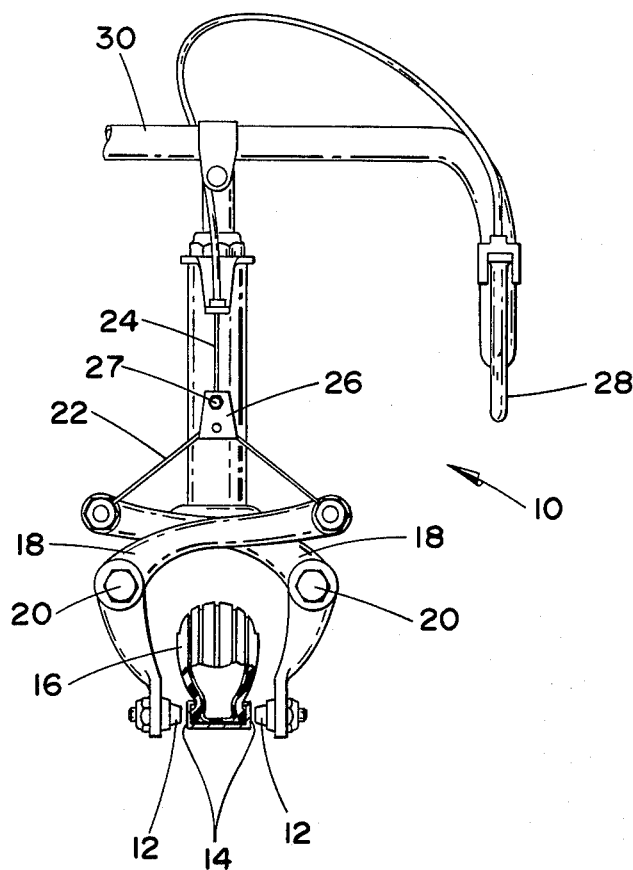
FIG. 1 is a schematic view of a representative dual caliper, bridle actuated bicycle brake system.

Referring to the drawing and initially to FIG. 1, a dual caliper, bridle actuated brake system 10 is illustrated. Brake system 10 comprises friction brake pads 12 which are moved into and out of braking engagement with rim 14 of the wheel 16. Brake pads 12 are supported on the lower ends of dual generally L-shaped calipers 18 which are pivotally supported at 20 to the bicycle frame.

The calipers 18 are pivoted by a cable bridle 22 to bring brake pads 12 into braking contact with rim 14. Bridle 22 is connected at its opposite ends to the upper ends of calipers 18 and to actuating cable 24 through a connector means 26. Connector means 26 has an arcuate recess portion which receives the mid-area of bridle 22 and a tube connector 27 through which the end of actuating cable 24 passes and is secured by a locknut. The actuating cable 24 is connected at its other end to the brake actuating levers 28 located on the handlebars 30 of the bicycle. Springs (not shown) bias the pads 12 out of braking contact with rim 14.

To apply the brakes, lever 28 is moved toward handlebars 30 which pulls actuating cable 24, bridle 22, calipers 18 and brake pads 12 into braking engagement with rim 14. Release of lever 28, permits the springs (not shown) to move the pads 12 out of engagement with rim 14. System 10 is customarily designated as a dual caliper, bridle actuated brakes and will be so designated herein.

The usual manner of adjusting brake system 10 includes manually squeezing pads 12 into a position which provides minimum clearance with rim 14. Then bridle 22 is correspondingly tensioned by stretching to establish the adjusted clearance position. This operation normally requires one hand to hold pads 12 relative to rim 14 and another to tension bridle 22. Without releasing the foregoing tension, the locknut of connector 27 must be loosened, actuating cable 24 pulled taut and the locknut tightened to establish a new point of connection to connector means 26. This adjustment serves to accommodate for wear of pads 14 and any stretch or slip in the cable actuating system.

It should be apparent from the aforedescribed method of adjusting brake system 10 that considerable effort, dexterity and patience is required. Moreover, the quality of the adjustment in many instances is not what is required to provide a good operable brake system for the bicycle.

Figure 2:
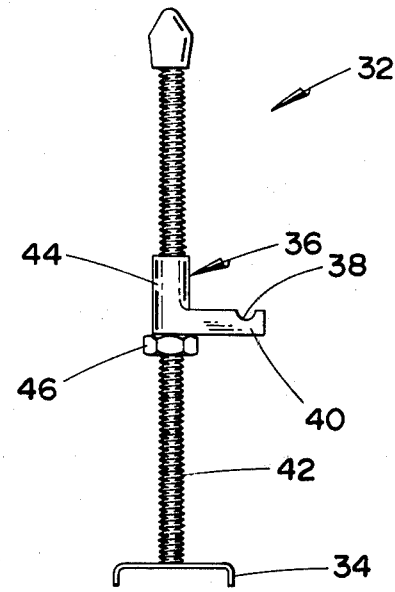
FIG. 2 is a perspective view of the tool according to the present invention.
Figure 3:
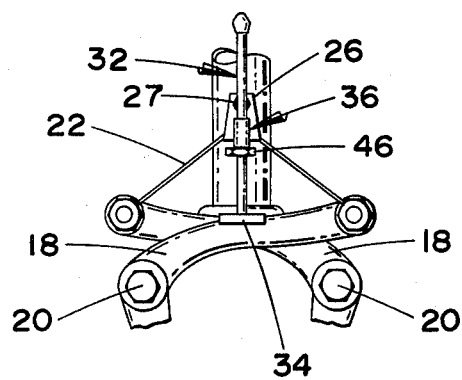
FIG. 3 is a partial view of the brake system of FIG. 1 illustrating the tool according to the present invention in operation in the cable actuation system.

The present invention provides a tool 32 illustrated in FIGS. 2 and 3 to provide for improved adjustment of brake system 10. Tool 32 functions to establish and then maintain the required tension on bridle 22 to establish the desired clearance between pads 12 and rim 14. The user is then free to adjust the connection between connector means 26 and actuator cable 24.

Tool 32 includes a base 34 which is shaped and sized to be readily supported on the generally horizontal reaches of calipers 18. Tension is applied and maintained through bridle engaging means or carriage 36 which engages bridle 22 in a bridle receiving recess 38 provided adjacent to the free end of one leg 40 of the generally L-shaped carriage. Carriage 36 is guided for movement along an elongated threaded guide means 42 extending from base 34. Guide 42 extends loosely through the other leg 44 of carriage 36 which is configured in the preferred embodiment as a sleeve or tubular-shaped member. Legs 40 and 42 may be formed by brazing or welding two discrete parts or by molding, stamping or machining.

Carriage 36 movement and positioning along guide 42 is controlled by positioning means which preferably is a nut 46. Rotation of nut 46 with carriage 36 abutting the upper or carriage abutting surface thereof will cause movement of the carriage in opposite directions along guide 42 depending on the direction of rotation of nut 46. Carriage 36 is prevented from separating from guide 42 by a suitable abutment 48 on the end of guide 42 which abutment may be a plastic cap which is pressed on the free end of guide 42.

The method of adjusting brake system 10 by using tool 32 as illustrated in FIG. 3 comprises the steps of locating base 34 on the horizontal reaches of calipers 18. Moving carriage 36 along guide 42 by rotating nut 46 to seat bridle 22 in recess 38. continue to move carriage 36 until pads 12 reach a position of minimum clearance with rim 14. Alternatively, the pads 12 can be moved into minimum clearance position by hand and the carriage 36 and nut 46 can be run along guide 42 until bridle 22 is tensioned to establish and maintain the desired clearance between the pads and rim.

With the bridle 22 properly tensioned and secured by carriage 36, the locknut in connector 27 can be loosened, actuator cable 24 drawn taut and the locknut tightened. Practically, the locknut should be loosened prior to tensioning bridle 22 to prevent buckling of actuator cable 24. The brake system 10 is thus properly adjusted and the tool 32 is removed by lowering nut 46 and carriage 36 until arm 40 clears bridle 22.

It should be apparent that tool 32 according to the present invention greatly simplifies adjustment of brake system 10. Tool 32 may accomplish its intended functions by configurations other than disclosed by the preferred embodiment. For example, guide 42 may have a rectangular cross-section and be unthreaded. In such a case the opening through leg 44 would have a corresponding rectangular cross-section and the nut 46 may be replaced by a spring clip biased into contact with the guide and releasable to move the carriage relative to the guide. Moreover, scissors-type actuators such as pantagraph linkage represents another example of a feasible approach for reciprocating the carriage to tension the bridle. However, the preferred embodiment represents currently the most feasible approach based on costs of manufacturing, ease of use, etc.

Having thus described our invention, we claim:

1. A tool for adjusting bridle actuated dual caliper brakes comprising: a base comprising a U-shaped member configured to engage, be supported on and exert compressive forces on the calipers, guide means comprising an elongated threaded shank secured to said base and extending outwardly therefrom, carriage means mounted on and moveable along said shank and having a transversely extending bridle engaging portion to exert selected tensions on the bridle by increasing the effective length of the tool action between the calipers and the engaging portion of the bridle and manually-actuated positioning means operatively associated with said threaded shank and said carriage means for securing said bridle engaging means in a selected position of adjustment relative to said guide means.

2. A tool as defined in claim 1, wherein said manually-actuated means includes said threaded shank and a threaded abutment means moveable along said threaded shank to engage and move said bridle-engaging means relative to said base.

3. A tool as defined in claim 1, wherein said carriage means comprises a generally L-shaped member, one leg of said L-shaped member being tubular and freely receiving therethrough said threaded shank and the other leg being said transversely extending portion having a bridle receiving area adjacent the free end thereof adapted to receive said bridle and exert tension on said bridle as said bridle-engaging means moves away from said base.

4. A tool as defined in claim 3, wherein said manually actuated means includes said threaded shank and threaded abutment means movable along said threaded shank and engageable with said one leg of said L-shaped member to prevent movement of said L-shaped member toward said base.

5. A tool as defined in claim 4, wherein said threaded shank includes an abutment on the end portion thereof opposite said base and engageable with said one leg of said L-shaped member to prevent movement of said L-shaped member off said guide means.

* * * * *